Dec. 2, 1952 R. H. POTTERS 2,619,776
METHOD AND APPARATUS FOR PRODUCING SMALL DIAMETER GLASS BEADS
Filed March 5, 1948 2 SHEETS—SHEET 1

INVENTOR.
RUDOLF H. POTTERS
BY
Hammond & Littell
ATTORNEYS

Dec. 2, 1952    R. H. POTTERS    2,619,776
METHOD AND APPARATUS FOR PRODUCING SMALL DIAMETER GLASS BEADS
Filed March 5, 1948    2 SHEETS—SHEET 2

INVENTOR.
RUDOLF H. POTTERS
BY
Hammond & Littell
ATTORNEYS

Patented Dec. 2, 1952

2,619,776

UNITED STATES PATENT OFFICE 2,619,776

METHOD AND APPARATUS FOR PRODUCING SMALL DIAMETER GLASS BEADS

Rudolf H. Potters, Jamaica, N. Y., assignor, by mesne assignments, of twenty per cent to Rudolf H. Potters, twenty per cent to Jessie H. Potters, both of Brielle, N. J., twenty-five per cent to Paul E. Potters, twenty-five per cent to Florence R. Potters, both of West Hampton Beach, N. Y., and ten per cent to Robert Potters, Manhasset, N. Y.

Application March 5, 1948, Serial No. 13,204

8 Claims. (Cl. 49—58)

This invention relates to the production of small glass beads of the order of .008" to .055" in diameter.

In certain fields, such as the production of reflecting motion picture screens, reflecting road signs and road markers and reflecting advertising signs, it is the practice to imbed glass beads of small diameter, within the size dimensions given above, in an adhesive matrix so that the beads backed by the adhesive matrix act as reflectors for light projected thereagainst. It is desirable that the beads be substantially spherical, as in most instances irregular and non-spherical beads or broken glass particles would cause defraction of the light rays to such an extent as to partially destroy the reflecting effect from the motion picture screen, road or advertising sign, or the like.

The production of small diameter glass beads of substantially uniform size and substantially true spheres, however, presents pronounced manufacturing difficulties. When attempts are made to produce small glass spheres by dropping molten glass through a heat zone in a manner similar to that used in the manufacture of lead shot, the results are unsatisfactory because it is difficult to get droplets of molten glass of uniform size and small enough to produce such small diameter glass beads, and in many instances such extremely small droplets are blown about by the air currents, to such an extent that the particles adhere together and produce small irregular clusters instead of beads.

Various attempts have been made to produce small diameter glass beads from ground glass particles by dropping or projecting these small particles through or into flames which will heat and soften the particles and cause them to take on a spherical shape. Such attempts are usually unsatisfactory because the small particles of glass cannot be subjected to a uniform heat or to a uniform period of treatment. They cannot be made to pass uniformly downward through a zone of flame in which there is sufficient draft to support combustion, and when dropped through the zone of flame so few of the particles remain in the heat zone a sufficient length of time to become softened and turned into spheres that the yield of spherical particles is only a very small percentage of the amount of ground glass particles dropped or projected through the flame.

It is the object of the present invention to provide a method and apparatus whereby ground glass particles may be fed into an upwardly flowing gas stream, which gas stream is later burned in a vertically positioned stack with particles suspended therein so that the ground glass particles are carried upward in the gas flame and are melted and rounded while in suspension in the flame to form small diameter spheres or beads in a more satisfactory manner and with higher yields than can be produced in the prior apparatus.

In the manufacture of beads according to the present invention, the ground glass particles are fed into a draft tube adjacent the bottom thereof and into an upwardly flowing air and gas stream, and are propelled through the tube by the combustion of gas and draft within the tube, so that they are melted and formed into true spheres while suspended in an upwardly travelling flame zone. In this manner it is possible by having the glass particles carried upwardly while suspended by the gases flowing through a confined draft tube, to maintain the beads for a sufficient period of time in a state of ebullition within the flame in the draft tube, whereby they have the opportunity to become rounded and to separate the formed beads from the hot gases as they pass out of the top of the draft tube.

The glass particles do not pass in a straight line through the draft tube or stack but are suspended in the flame in a state of ebullition somewhat similar to that of a fluidized catalyst.

Inasmuch as the gases in passing through the draft tube become hotter from the bottom to the top thereof, the draft is automatically increased so that the particles are carried out of the top of the draft tube and separated from the flame in the form of practically 100% spherical particles.

In the accompanying drawings:

Figure 1a illustrates a modified form of embodiment of feeding means.

Figure 1:
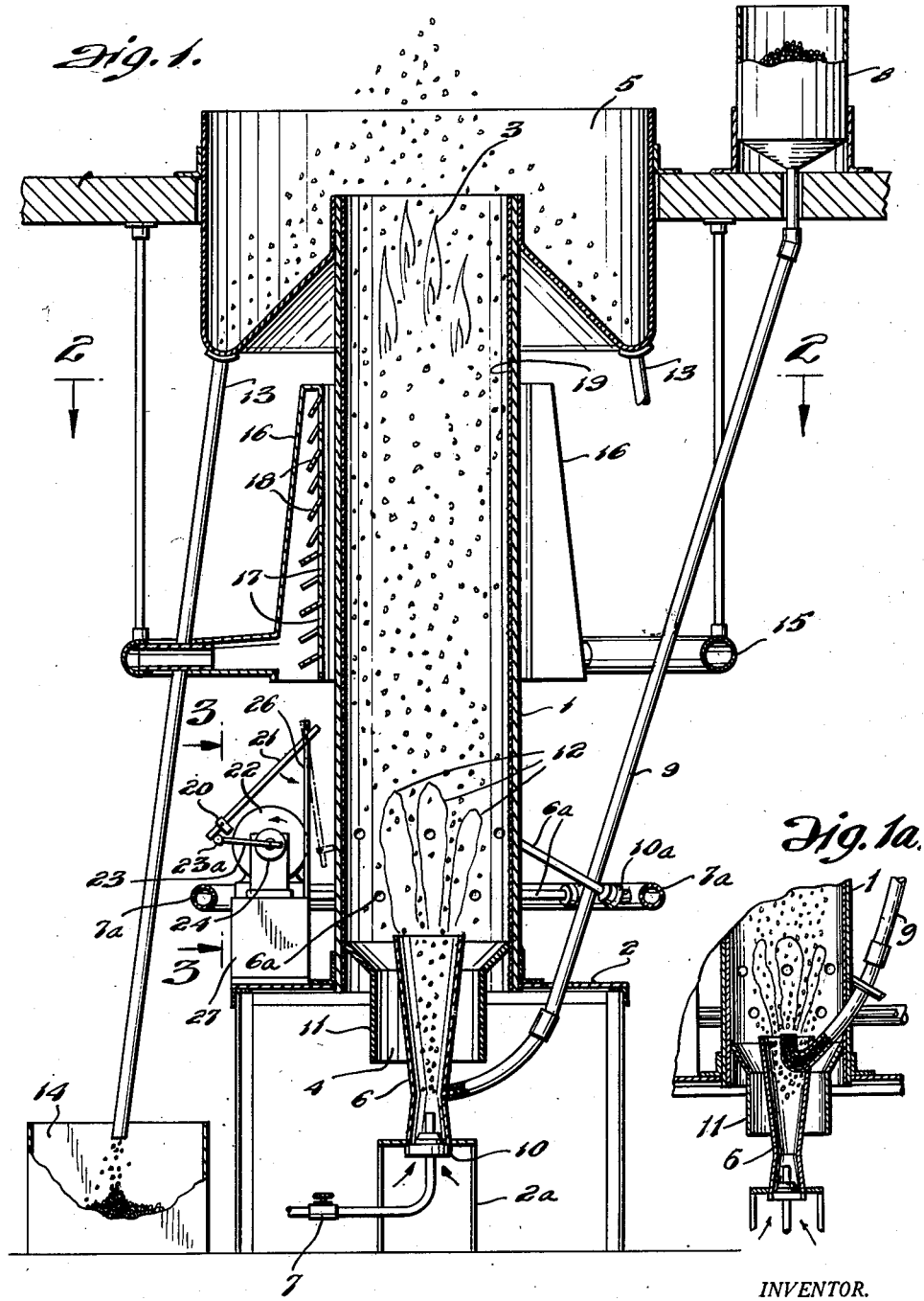
Figure 1 is a sectional view of the draft tube and heating means, illustrating one method of feeding the glass particles into the gas stream in the bottom of the draft tube.
Figure 2:
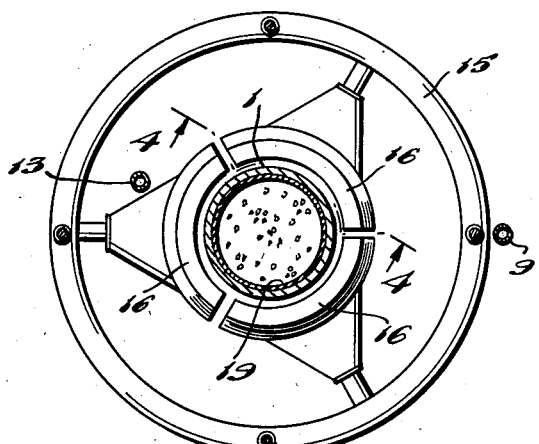
Figure 2 is a sectional view substantially on the line 2—2 of Figure 1.
Figure 4:
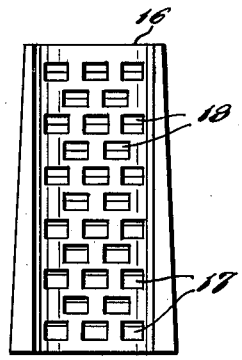
Figure 4 is a view along the line 4—4 of Figure 2.
Figure 3:
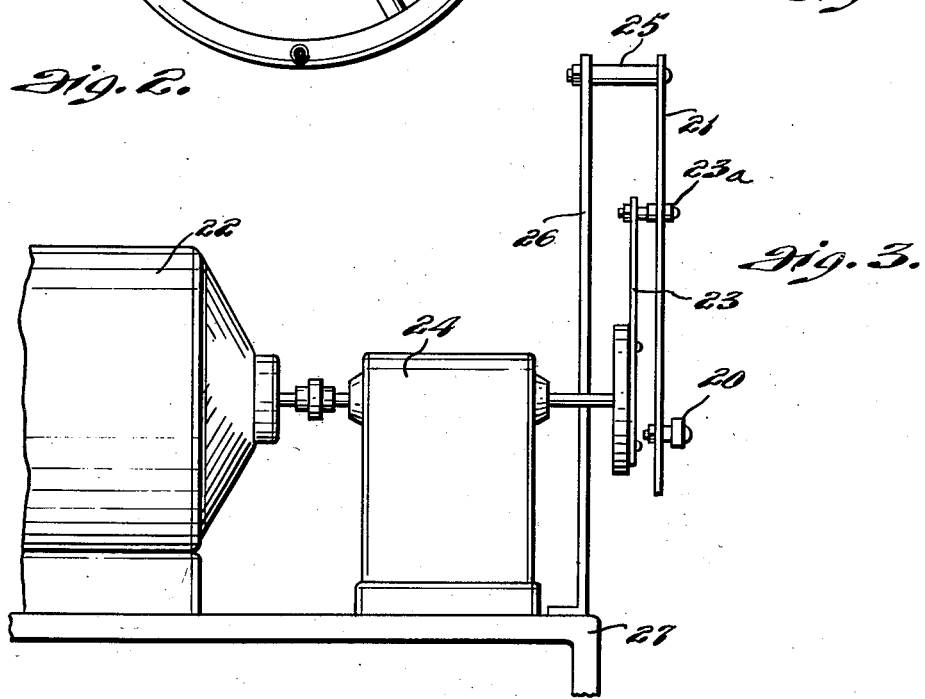
Figure 3 is a view substantially along the line 3—3 of Figure 1.

In the embodiment of apparatus illustrated, a draft tube or stack 1 is provided, which may be of any length and diameter but is preferably of a diameter of approximately 15" to 18" and the length of approximately 12'. The draft tube 1 is mounted in a vertical position on a supporting table 2 and is left substantially open at the top 3 and bottom 4. Around the top a hopper or series of hoppers 5 are provided into which the spheres may drop, the bottom of the hopper 5 being preferably located a sufficient distance below the top of the draft tube 1 to permit cooling of the beads in dropping out of the flame which passes out of the top of the draft tube 1, so that the spheres will be sufficiently cool before reaching the bottom of the hopper 5 that they will not stick together.

A gas burner 6, receiving gas from any suitable source of supply 7 is removably mounted on an open spider 2a at the bottom of the draft tube 1, and the ground glass particles, sized to approximately the size of the beads to be produced, may be fed into the gas stream passing through the burner 6 from a hopper 8 by means of a tube or series of tubes 9. Instead of feeding the ground glass particles into the gas stream in the burner 6, the particles may be fed into the gas stream as it emerges into the bottom of the draft tube 1 in any suitable way, whereby they become disseminated in the gases flowing into the draft tube before the point of combustion of the gases.

For example, they may be fed into the gas stream adjacent the bottom of the draft tube 1 as illustrated in Figure 1a by passing the tube 9 or a plurality of tubes 9 through the walls of the draft tube 1 and into the gas stream as it emerges from the top of burner 6. While gravity feed through the tube 9 is preferable, any suitable mechanical or air jet feed may be used to feed the glass particles into the burner 6 or into the draft tube or stack 1 below the flame zone therein.

Air is admitted into the bottom of the burner 6 by regulatable openings in valve 10 around the gas pipe 7 in the usual manner of regulating air flow to a gas burner, and the air flow around the gas pipe 7 plus the flow of gas from the end of the pipe 7 is sufficient to create a Venturi effect at the constricted portion of the burner 6 where the tube 9 enters the burner, which is sufficient to carry the glass particles emerging from the tube or tubes 9 upward into the stack. Although the pressure of the gas in the pipe 7 with the natural draft of air is sufficient to carry the glass particles upward into the flame in the stack 1, if desired compressed air or other artificial draft producing means may be used in the burner 6.

The flame of the gas burner is regulated to provide complete combustion within the draft tube 1 with no carbon formation and yet prevent an excess of air. The primary air inlet 10 is at the bottom of the burner 6 and the flow of air into the burner is regulated turning one part of the air inlet 10 relative to the other part in the usual ways for regulating air flow to a gas burner. The draft in the stack 1 may also be regulated by secondary air control funnel 11 which, however, leaves a passage between the inside of the funnel 11 and the sides of the burner 6. To provide for different rates of air flow through the tube 1, different size funnels 11 may be used by removing one funnel 11 and replacing it with a larger or smaller funnel as described in my prior Patent No. 2,334,578. While a specific form of draft regulator has been shown in my prior Patent No. 2,334,578 and in this application, it will be understood that other forms may be used and that anything which accomplishes the object of increasing or decreasing the flow of air through the draft tube may be used to regulate said draft. Within the draft tube 1 the gas burns in a plurality of cones of flame which begin to burn at approximately the points 12, and which continue to burn to the point where the flame projects approximately 1 to 2 ft. above the top 3 of the draft tube 1. If desired, additional heat may be provided by projecting additional gas burners 6a, which may be fed from a gas manifold 7a and provided with regulators 10a through the walls of the tube 1, in one or more tiers. The ground glass particles which are suspended in the gas stream take on various motions of the gas as currents but in general are maintained in a state of ebullition while suspended in the flame zone, whereby they are subject to uniform heat on all sides and become spherical or rounded in their passage through the draft tube.

If additional burners 6a are used, the glass particles may be projected upwardly into the flame zone by the air stream alone flowing through the burner 6 or by the combined air and fuel stream as illustrated.

Inasmuch as the heat within the tube is progressively increased from the bottom to the top thereof by the burning of the gas, the draft acting on the glass particles is automatically increased as they move upward in the draft tube, so that the glass particles are carried out of the draft tube and fall in an umbrella-like spray from the top 3 of the draft tube into the hopper 5. In falling in this fashion from the top of the draft tube, the glass particles are automatically cooled to the point where they no longer stick or adhere together in the hopper 5. From the bottom of the hopper 5 a plurality of conduits 13 extend to receptacles 14, in which the formed glass beads are collected.

In their passage through the draft tube 1, some of the glass particles will collide with other glass particles in a heated state and will stick together to form clover leaf clusters. These clusters, being heavier than the single glass particles, do not remain suspended in the gas stream but fall downwardly through the flame and out of the funnel 11 at the bottom of the draft tube 1. The gas stream flowing through the burner 6 has sufficient velocity to deflect these falling glass particles, so that they do not fall into the top of the burner but are deflected to the sides where they can fall out of the bottom of the tube 1.

To prevent the walls of the stack or draft tube 1 from becoming too hot and having particles of molten glass adhere thereto, the outer walls of the stack are artificially cooled by means of a series of air jets blown from a manifold 15 into spreading devices 16 which substantially surround the stack 1 and are uniformly spaced therefrom. The inner walls of the spreading devices 16 are provided with a series of openings 17, each controlled by a flap 18 struck out from the inner walls of the spreaders 16. The flaps 18 are not hinged, but are left integrally connected with the metal of the inner part of the spreaders 16 along one side, so that flaps 18 may be bent to any angle desired and left in this position. In this way, it is possible by observation and correction to direct more or less air against any particular portion of the tube 1 which seems to be hotter than another portion, so as to provide more uniform cooling of the tube.

The inner wall of the draft tube 1 is also provided with a refractory coating 19, which preferably extends from the top to substantially the bottom of the draft tube and is of such a nature as to prevent adherence of the heated glass particles to the walls of the tube. The adherence of any of the glass particles to the walls of the tube provides obstructions against which other heated glass particles collide and therefore tend to build up in the form of icicles on the inside of the tube. By providing a refractory coating 19 of such a nature that the particles do not adhere directly to the metal walls of the tube but adhere to the coating, when the particles or icicles have built up to a point where they overcome the strength of the refractory coating, they will break away a portion of the coating and fall by gravity to the bottom of the draft tube 1 and out through the space provided between the burner 6 and the regulating funnel 11.

Various types of refractory coatings may be used, but I find it preferable to apply a magnesite coating in a liquid binder in the form of a suitable wash which coats the inside of the stack 1. When sufficient of the refractory coating has been removed by particles dropping therefrom, or by the effect of the heat on the inside of the tube which causes spalling and breaking away of parts of the coating, the operation of the bead making is stopped for a sufficient length of time to permit the stack to cool and be recoated by applying the coating in the form of a spray or wash which is dried in place by the residual heat of the stack. This coating is normally renewed every three or four hours of operation.

To prevent the adhering particles from building into too large size on the inside of the draft tube 1, a knocker or vibrator 20 is mounted on pivoted arm 21 adjacent the bottom of the draft tube 1 and a motor 22 provided with a cam member 23 causes the knocker 20 to be lifted to the full line position illustrated in Figure 1 approximately once every twenty seconds, from which position it is released by the passage of the cam 23 from the end of the rocker arm 21, so that the knocker 20 swings to the dotted line position illustrated in Figure 1 and strikes a blow against the bottom of the tube 1, which is sufficient to dislodge adhering particles or icicles from the inside wall of the tube 1.

The motor 22 is connected through a speed reducing gear 24 to the shaft which carries the cam arm 23 having a roller 23a which contacts with the pivoted arm 21. The arm 21 is pivoted through a spacer 25 to a bracket 26 mounted on the base 27, which supports the motor 22 and speed reducing gear 24. Instead of a rotating cam 23 actuating the knocker 20, any suitable vibrating mechanism delivering a sufficiently strong blow to the tube 1 at spaced intervals to cause dislodgement of adhering particles may be used.

Figure 5:
Figure 5 is an enlarged view indicating the shape of one of the ground glass particles before being subjected to heat.
Figure 6:
Figure 6 is an enlarged view showing the spherical shape of the glass after it has been formed into beads.

The ground glass particles of irregular shape which are fed into the draft tube 1 are illustrated in enlarged size at 28 in Figure 5, and the spherical shape of the finished particles in enlarged size is illustrated at 29 in Figure 6.

The term "gas stream" as used herein is intended to include either the air or the fuel gas stream or both.

While I have described a preferred method and apparatus for forming glass beads from small glass particles, it will be understood that various modifications and changes may be made from the method and apparatus herein described without departing from the spirit of my invention or the scope of the appended claims.

I claim:

1. The method of producing small diameter glass beads from ground glass particles in a vertically disposed draft tube, which comprises introducing said ground glass particles adjacent the bottom of said draft tube and dispersing the glass particles in an upwardly flowing fuel gas stream within said draft tube, burning said fuel with the ground glass particles suspended therein within said draft tube, whereby the said glass particles are melted in suspension and caused to assume a spherical shape, causing the combustion gases and suspended glass particles to move upward in said draft tube until the spherical glass particles pass out of the top of the tube, causing the spherical glass particles to drop from the top of said draft tube into collecting chambers around and below the top of said draft tube, whereby said particles are cooled and collected, and periodically vibrating said tube to cause irregular agglomerates of glass particles adhering to the walls of said tube to drop from the bottom of said draft tube.

2. In an apparatus of the type described a vertically disposed open ended draft tube, a source of heat within the tube, means to control the flow of air through the tube, an inlet conduit connected to said tube for introducing a stream of glass particles into the tube below the source of heat, a coating on the walls of the tube to prevent adherence of the glass particles to the walls of the draft tube, a hopper at the top of the tube to receive the glass particles which are discharged from the top of said tube, and means to periodically jar the tube to dislodge adhering glass particles therefrom.

3. In an apparatus of the type described a vertically disposed open ended draft tube, a source of heat within the tube, means to control the flow of air through the tube, an inlet conduit connected to said tube for introducing a stream of glass particles into the tube below the source of heat, a coating on the inside walls of the tube to prevent adherence of the glass particles to the walls of the draft tube, means to cool the draft tube on the outside, a hopper at the top of said tube to receive the glass particles which are discharged from the top of said tube, and means to periodically jar the tube to dislodge adhering glass particles therefrom.

4. In a method of making small glass beads from irregular glass particles, the steps of producing a confined, upwardly traveling column of a combustible mixture of air and fuel gas, regulating the upward velocity of the mixture and the proportions of fuel gas and air to produce flaming substantially throughout the length of the column, introducing the particles in an upward flow of gas at the middle of and adjacent to the bottom of the column, maintaining the upward velocity of the gas column sufficient to carry the particles in continuous suspension and turbulence to the top of the column, fusing the particles so that they assume a spherical shape while in the flaming gases, and discharging the particles from the top of the flaming column.

5. The method of producing small diameter glass beads from ground glass particles in a vertically disposed draft tube, which comprises introducing such ground glass particles into the tube in a gas stream passed upwardly into the tube through the lower end thereof, flowing another gas stream upwardly into the lower end of the tube and around the first mentioned stream, at least one of said streams containing a combustible gas, continuously merging said streams in the lower part of said tube and igniting the combustible gas therein and maintaining the velocity and compositions of said streams such that they produce an upwardly streaming flaming gas column substantially throughout the length of the tube, melting introduced glass particles to cause them to become spherical while continuously carrying them generally upward in suspension in said flaming gas column, discharging spherical glass particles from the gas column above the top of the tube, and precipitating agglomerates of glass particles from said column through said other gas stream at the lower end of the draft tube.

6. In a method of making small glass beads from irregular glass particles, the steps of producing a confined, upwardly traveling column of a combustible mixture of air and fuel gas, regulating the upward velocity of the mixture and the proportions of fuel gas and air to produce flaming substantially throughout the length of the column, introducing the particles in an upward flow of gas at the middle of and adjacent to the bottom of the column, maintaining the upward velocity of the gas column sufficient to carry the particles in continuous suspension and turbulence to the top of the column, fusing the particles so that they assume a spherical shape while in the flaming gases, and discharging the particles from the top of the flaming column.

7. In a method of making small glass beads from irregular glass particles in a vertical draft tube, the steps of introducing combustion gas components comprising fuel gas and air into the tube through the bottom thereof, igniting said components and maintaining the proportions of fuel gas and air such as to produce flaming substantially to the top of the tube, introducing such glass particles into a gas stream containing at least one of such components and flowing such stream upwardly into the tube at a velocity sufficient to discharge the glass particles into the tube, carrying the particles in the flaming gases upwardly within and out the top of the tube, and fusing the glass particles into spherical shape as they ascend in the flaming gases.

8. In a method of making small glass beads from irregular glass particles in a vertical draft tube, the steps of introducing combustion gas components including fuel gas and air into the tube through the bottom thereof, igniting said components and maintaining the proportions of fuel gas and air such as to produce flaming substantially to the top of the tube, introducing such glass particles into a gas stream containing at least one of said components and flowing such stream upwardly into the tube at a velocity sufficient to discharge the particles into the tube, carrying the particles in the flaming gases upwardly within and out the top of the tube, fusing the glass particles into spherical shape as they ascend in the flaming gases, and periodically vibrating the tube to cause accumulations of glass on the walls of the tube to drop through the bottom of the tube.

RUDOLF H. POTTERS.

REFERENCES CITED

The following references are of record in the file of this patent:

UNITED STATES PATENTS

| Number | Name | Date |
| --- | --- | --- |
| 1,513,622 | Manning | Oct. 28, 1924 |
| 1,924,788 | Hobson | Aug. 29, 1933 |
| 2,044,680 | Gilbert | June 16, 1936 |
| 2,112,643 | Baensch et al. | Mar. 29, 1938 |
| 2,300,042 | Caldwell | Oct. 27, 1942 |
| 2,334,578 | Potters | Nov. 16, 1943 |
| 2,421,902 | Neuschotz | June 10, 1947 |